3,849,357
PIGMENTED MASONRY WATER REPELLENT COMPOSITION CONTAINING ALKYLTRIALKOXY SILANE-ALKYL ORTHOSILICATE REACTION PRODUCT SILICONE RESIN
George Robert Wolf, Clinton, Mich., assignor to Stauffer Chemical Company, Westport, Conn.
No Drawing. Continuation-in-part of application Ser. No. 150,208, June 4, 1971, which is a continuation of application Ser. No. 886,001, Dec. 17, 1969, which in turn is a continuation-in-part of application Ser. No. 676,627, Oct. 19, 1967, all now abandoned. This application June 25, 1973, Ser. No. 373,589
Int. Cl. C08f 45/24
U.S. Cl. 260—29.6 NR      5 Claims

ABSTRACT OF THE DISCLOSURE

A pigmented masonry water repellent composition comprising a mixture of a water-base paint and a silicone resin obtained from the reaction of an alkyltrialkoxysilane, an alkyl orthosilicate and water.

---

This is a continuation-in-part application of applicant's copending application Ser. No. 150,208, filed June 4, 1971 and now abandoned, which was a continuation of applicant's copending application Ser. No. 886,001, filed Dec. 17, 1969, now abandoned, which was a continuation-in-part of applicant's copending application Ser. No. 676,627, filed Oct. 19, 1967, and now abandoned.

This invention relates to a paint composition, particularly a paint composition having water repellent properties and more particularly to a pigmented masonry water repellent.

Heretofore, organopolysiloxanes have been incorporated in coating compositions such as paints to improve wettability, prevent flocculation of the pigment and to produce a better gloss in the paint film. Although organopolysiloxanes provided improved gloss in paint films, these compositions were not suitable as masonry water repellents. In addition, most of the organopolysiloxanes are water insoluble which prohibited their use in water-base paints. Furthermore, the conventional pigmented compositions containing organopolysiloxanes produced films which peeled and cracked when applied to porous substrates. Also the previously known pigmented compositions containing masonry water repellents were inflammable and toxic. In addition, it was all but impossible to apply successive coatings of a pigmented composition to a previously dried masonry water repellent film.

It is therefore an object of this invention to provide a pigmented water repellent composition. Another object of this invention is to provide a pigmented water repellent composition for porous substrates. Still another object of this invention is to provide a pigmented masonry water repellent composition. An additional object of this invention is to provide a pigmented water repellent composition which does not require special mixing equipment or mixing techniques. A further object of this invention is to provide a pigmented water repellent composition over which successive coatings may be applied. A still further object of this invention is to provide a water-base pigment composition which may be used to render porous materials water repellent.

The foregoing objects and others which will become apparent from the following description are accomplished in accordance with this invention, generally speaking, by providing pigmented water repellent compositions comprising an oleoresinous emulsion paint and a silicone resin obtained from the reaction of an alkyltrialkoxysilane, an alkyl orthosilicate and water.

In other words, the pigmented water repellent composition may be prepared by incorporating in a conventional water-base emulsion paint an aqueous reaction product consisting of an alkyltrialkoxysilane and an alkyl orthosilicate. The alkyltrialkoxysilane and alkyl orthosilicate are hydrolyzed and condensed in the presence of water to form a polymeric material having Si-O-Si linkages which impart water repellent properties to a substrate coated therewith.

The alkyltrialkoxysilanes have from 1 to 6 carbon atoms such as methyltriethoxysilane, methyltripropoxysilane, propyltrimethoxysilane, methyltrihexoxysilane, ethyltributoxysilane, ethyltripentoxysilane, propyltriethoxysilane, propyltrihexoxysilane, butyltriethoxysilane, hexyltrimethoxysilane, hexyltripropoxysilane and the like.

The alkyl orthosilicates have alkyl groups which may be the same or different of from 1 to 4 carbon atoms such as methyl, ethyl, propyl or butyl groups.

The silicone compositions employed in this invention may be prepared by reacting a mixture of, for example, from 1 to 3 parts of an alkyltrialkoxysilane and from 3 to 1 part of an alkyl orthosilicate with approximately an equal volume of water or a very dilute solution of an acid in water to form a water soluble silicone resin composition which is then admixed with a water-base paint composition and applied to a porous substrate.

It has been found that the presence of an alcohol facilitates hydrolysis of the silane and renders the silane and silicate mutually miscible thereby facilitating the hydrolysis and condensation of the silicone materials. The benefit derived from the presence of inherent alcohol in the system can be substantially increased by adding as an additional ingredient an alcohol containing up to 2 carbon atoms. The alcohol ingredient can be added in an amount up to twice the combined amount of silane and silicate components. However, where a substantial amount of alcohol has been added to facilitate the hydrolysis and condensation reaction, it should be removed prior to the addition of the silicone resin to the water-base paint.

Also, it has been found that a mixture consisting of an alkyltrialkoxysilane and an alkyl orthosilicate may be added directly to a water-base paint composition to form a pigmented composition having water repellent properties. In a preferred embodiment, a mixture consisting of from about 1 to 3 parts of methyltrimethoxysilane and 3 to 1 part of tetraethyl orthosilicate is added to a water-base paint composition in an amount of from about 2 to 40 percent by weight based on the total weight of the composition to form an aqueous soluble product which will impart water repellent properties to a porous substrate.

The exact chemical reaction which takes place between the alkyltrialkoxysilane, alkyl orthosilicate and water is not known with certainty and it is not intended to limit the present invention to any particular mode of reaction. It may, however, be postulated that what takes place is an intermolecular condensation and polymerization which eliminates water and/or alcohol. It is known, for example, that the water solution found as a result of the reaction dries to a hard water repellent film even when the drying takes place under an atmosphere of nitrogen. This fact tends to rule out the possibility that the reaction involves free radicals formed under the influence of the oxygen in the air. The same composition results whether the drying takes place in air or under nitrogen. The reaction of water with the alkyltrialkoxysilane and/or the alkyl orthosilicate apparently produces alcohols and silanol groups. The silanol groups condense with each other to form Si-O-Si linkages and water. The silanol groups also condense with alkoxy groups and alkyltrialkoxysilane and/or the alkyl orthosilicate to form alcohols and Si-O-Si linkages.

Generally, the composition obtained from the reaction of alkyltrialkoxysilane and alkyl orthosilicate with water is more stable in an acidic system, e.g. a pH of from about 2 to 6, than in a neutral or basic system. Consequently, it is preferred that a dilute acid solution such as hydrochloric acid, sulfuric acid diethyl hydrogen phosphite, ethyl dihydrogen phosphite or a mixture of diethyl phosphite and phosphoric acid in a 1:1 mole ratio be added to the silane composition in order to maintain the pH in the desired range. The amount of acid should not exceed about 10 percent and more preferably from about 1 to 3 percent by weight based on the weight of the silicone composition. The composition thus formed may be added to an emulsion paint in which an oleoresinous, alkyd or other oil phase material is emulsified with an aqueous phase by conventional techniques known in the art, such as by stirring, milling and the like.

The organic resinous material employed in the water-base paint formulations are generally obtained from the polymerization or copolymerization of vinyl monomers such as vinyl acetate, vinyl chloride, acrylic and methacrylic acid, esters of acrylic and methacrylic acid, styrene, butadiene and the like. It is preferred that these resinous materials consist of polymers, copolymers and terpolymers of acrylic acid, methacrylic acid, acrylates, methacrylates, vinyl chloride and combinations thereof.

Even though the concentration of silicone resin in the paint composition is not critical and may range from about 2 to 40 percent, it is preferred that it range from about 2 to 20 percent and more preferably from about 5 to 15 percent by weight based on the total weight of the composition. When an aqueous solution of the silicone resin is added to the paint composition, it is preferred that the silicone concentration of the solution be from about 20 to 50 percent solids, otherwise the paint composition will be diluted to such an extent that it will be difficult to obtain the desired viscosity and degree of pigmentation.

The composition of this invention may be applied to a porous masonry substrate to provide a pigmented, tough, hard abrasion resistant water repellent film. The composition is non-flammable, neutral and non-toxic. Furthermore, successive coatings of this composition may be applied to the porous substrate without having the disadvantages of peeling, cracking or streaking.

The invention is further illustrated but is not intended to be limited by the following examples in which all parts and percentages are by weight unless otherwise specified.

EXAMPLE 1

Approximately 20 parts of methyltrimethoxysilane are admixed with about 20 parts of water and agitated for about 10 minutes. A clear solution is obtained after the exothermic reaction subsided and about 20 parts of tetraethyl orthosilicate are added with agitation. After about 5 minutes, an exothermic reaction is again noted resulting in a clear solution which is undiluted with about 20 parts of water.

About 5 parts om the above solution is mixed with about 1995 parts of a water-base paint composition having the following ingredients:

| | Parts |
|---|---|
| Titanium dioxide | 20 |
| Silicates | 12 |
| Acrylic polymer | 35 |
| Volatiles (water) | 65 |

Concrete cubes are coated with the above composition and stored at a relative humidity of from 50 to 90 percent at 70° to 90° F. for 48 hours. The cubes are removed, weighed and totally immersed for 24 hours in water with a ¼ inch head. The cubes are removed, blotted to remove excess water and weighed. The percent water absorbed is calculated from the weight gain and initial cube weight.

The above example is repeated, except different proportions of silicone resin are used. The percent water absorption is illustrated in Table I.

TABLE I

| | Paint, parts | Percent water absorption, 24 hours |
|---|---|---|
| Silicone resin, parts: | | |
| 5 | 195 | 6.7 |
| 10 | 190 | 6.7 |
| 20 | 180 | 5.3 |
| 30 | 170 | 3.2 |
| 40 | 160 | 3.2 |
| 50 | 150 | 7.4 |
| Control | | 7.4 |

EXAMPLE 2

In accordance with the procedure described in Example 1, approximately 20 parts of propyltrimethoxysilane are admixed with about 20 parts of water and the above experiment repeated. The percent water absorbed is illustrated in Table II.

TABLE II

| | Paint, parts | Percent water absorption, 24 hours |
|---|---|---|
| Silicone resin, parts: | | |
| 5 | 195 | 6.2 |
| 10 | 180 | 6.2 |
| 20 | 180 | 5.0 |
| 30 | 170 | 3.5 |
| Control | | 7.4 |

EXAMPLE 3

About 10 parts of the silicone composition prepared in accordance with the procedure described in Example 1 are mixed with about 0.15 part of a product obtained from the reaction of 1 mole of diethylhydrogen phosphite and 1 mole of phosphorous acid and about 100 parts of a paint having the composition:

| | Parts |
|---|---|
| Titanium dioxide | 16 |
| Silicates | 15 |
| Acrylic polymer | 33 |
| Volatiles (water) | 67 |

The composition is brushed on two inch cement cubes, dried and immersed in water. Approximately 1.4 percent water is absorbed by the treated cubes, whereas untreated cubes absorbed approximately 7.4 percent.

EXAMPLE 4

Approximately 10 parts of methyltrimethoxysilane, about 10 parts of tetraethyl orthosilicate and about 0.15 part of the phosphate mixture described in Example 3 are added with agitation to about 100 parts of a water-base pigment composition having the ingredients:

| | Parts |
|---|---|
| Titanium dioxide | 23 |
| Magnesium silicate | 6 |
| Latex resin (acrylic) | 20 |
| Water | 51 |

After mixing for about 0.5 hour, the composition is applied by brushing to concrete cubes and stored at a relative humidity of from 50 to 90 percent at a temperature of from 70° to 90° F. for 48 hours. The cubes are removed, weighed and totally immersed for 24 hours in water with a ¼ inch head. The cubes are removed, blotted to remove excess water and weighed. The percent water absorbed is calculated from the weight gain and initial cube weight. Approximately 1.8 percent water is absorbed by the treated cubes, whereas the untreated cubes absorbed approximately 7.4 percent.

EXAMPLE 5

(a) Approximately 0.15 part of a phosphate mixture obtained from the reaction of 1 mole of diethylhydrogen phosphate and one mole of phosphorous acid is added to a mixture containing about 20 parts of methyltrimethoxysilane, about 20 parts of tetraethyl orthosilicate and 40 parts of water to form a solution containing about 50 percent silicone resin.

Concrete cubes are coated with the silicone resin solution and stored at a relative humidity of from 50 to 90 percent at 70° to 90° F. for 48 hours. The cubes are removed, weighed and totally immersed for 24 hours in water with a ¼ inch head. The cubes are removed, blotted to remove excess water and weighed. Approximately 5.8 percent water is absorbed by the treated cubes, while the untreated cubes absorbed about 7.4 percent.

(b) In a similar experiment, concrete cubes are coated with a pigment composition having the following ingredients:

| | Parts |
|---|---|
| Titanium dioxide | 23 |
| Magnesium silicate | 6 |
| Latex resin (acrylic) [1] | 20 |
| Water | 51 |

[1] 1–5% methacrylic acid; 55–70% ethyl acrylate; 44–25% methylmethcrylate.

The cubes are stored at a relative humidity of from 50 to 90 percent at 70° to 90° F. for 48 hours, then immersed in water for 24 hours with a ¼ inch head. Approximately 6.5 percent water is absorbed by the treated cubes, while the untreated cubes absorbed about 7.4 percent.

(c) About 9.4 parts of the silicone resin solution prepared in accordance with Example 5(a) is mixed with 100 parts of the pigment composition of Example 5(b) and applied to concrete cubes. The cubes are stored for 48 hours at a relative humidity of from 50 to 90 percent and at a temperature of from 70° to 90° F. and then immersed in water for 24 hours. The percent of water absorbed by the treated cubes is less than about 5.5 percent while untreated cubes absorbed about 7.4 percent water.

The above example is repeated, except that different amounts of the silicone resin solution of Example 5(a) are combined with the pigment composition. The results are illustrated in Examples 5(d) to (h) in Table III.

TABLE III

| Example No. | Silicone resin solution, parts | Pigment composition, parts | Water absorbed, percent |
|---|---|---|---|
| 5(a) | (¹) | | 5.8 |
| 5(b) | | (²) | 6.5 |
| 5(c) | 8.6 | 100 | >5.5 |
| 5(d) | 20.0 | 100 | 1.8 |
| 5(e) | 33.4 | 100 | 1.8 |
| 5(f) | 57.2 | 100 | 1.9 |
| 5(g) | 66.8 | 100 | 1.8 |
| 5(h) | 75.0 | 100 | >2.0 |

¹ Control—silicone resin solution only.
² Control—pigment composition only.

EXAMPLE 6

In a similar experiment, concrete cubes are coated with the trimethoxysilane-tetraethyl orthosilicate solution of Example 5(a) and stored for 48 hours at a relative humidity of from 50 to 90 percent at a temperature of from 70° to 90° F. The cubes are then coated with the pigment composition of Example 5(b) and again stored at 70° to 90° F. for 48 hours at a relative humidity of from 50 to 90 percent. The coated cubes are immersed in water for 24 hours. The percent of water absorbed by the treated cubes is about 2.2 percent, while the untreated cubes absorbed about 7.4 percent.

EXAMPLE 7

About 20 parts of the silicone resin solution prepared in accordance with the procedure described in Example 5(a) is mixed with 100 parts of a pigment composition containing the following ingredients:

| | Parts |
|---|---|
| Titanium dioxide | 22.3 |
| Magnesium silicate | 10.4 |
| Ethylene glycol | 2.2 |
| Soya lecithin | 1.3 |
| Hydroxyethylcellulose | 0.1 |
| Acrylic latex [1] | 34.0 |
| Water | 29.7 |

[1] Methyl methacrylate-ethylacrylate-methacrylic acid terpolymer.

Concrete cubes are coated with the silicone resin-pigment composition and stored at a relative humidity of from 50 to 90 percent at a temperature of from 70° to 90° F. for 48 hours. The cubes are removed, weighed and totally immersed in water with a ¼ head. After 24 hours the cubes are removed, blotted to remove excess water and reweighed. The treated cubes absorbed less than 2.2 percent water.

Other water-base latex emulsion paint compositions have been substituted for the above paint compositions with substantially the same results.

Although the invention has been described in considerable detail in the foregoing, it is to be understood that such detail is solely for the purpose of illustration and that many variations may be made by those skilled in the art without departing from the spirit and scope of the invention.

The invention claimed is:

1. A pigmented water repellent composition consisting essentially of a water-base paint composition containing a pigment, an organic resinous material selected from the class consisting of polymers of acrylic acid, methacrylic acid, alkyl esters of acrylic acid and methacrylic acid, an aqueous solution containing from 20 to 50 percent by weight of a silicone resin based on the total weight of the solution, said silicone resin is obtained from the reaction of from 1 to 3 parts of an alkyltrialkoxysilane having from 1 to 6 carbon atoms in the alkyl group with from 3 to 1 parts of an alkyl orthosilicate having from 1 to 4 carbon atoms in each alkyl group and water in an amount ranging from 0.4 to about 100 times the combined volume of the alkyltrialkoxysilane and the alkyl orthosilicate, and an acid selected from the group consisting of hydrochloric acid, sulfuric acid, ethyl hydrogen phosphite, diethyl hydrogen phosphite and mixtures of diethyl hydrogen phosphite and phosphorous acid in an amount to provide a pH of from 2 to 6, said water repellent composition containing from 2 to 40 percent by weight of the silicone resin based on the weight of said composition.

2. The composition of Claim 1 wherein the paint composition contains from 5 to 15 percent of the silicone resin.

3. The composition of Claim 1 wherein the alkyltrialkoxysilane is a methyltrimethoxysilane.

4. The composition of Claim 1 wherein the acid is a mixture of a diethyl hydrogen phosphite and phosphorus acid in a 1:1 mole ratio.

5. The composition of Claim 1 wherein the paint composition contains from 10 to 35 percent by weight of the organic resinous material.

References Cited

UNITED STATES PATENTS 3,310,417  3/1967  Lerner et al. _____ 106—287

FOREIGN PATENTS 673,067  10/1963  Canada _____ 260—29.6

HAROLD D. ANDERSON, Primary Examiner

U.S. Cl. X.R.

52—517; 117—161 ZA; 260—17 R, 23 R, 29.6 R, 29.6 S, 29.6 MM, 29.6 MP, 29.7 R, 29.7 NR, 827